United States Patent
Park et al.

(10) Patent No.: US 10,054,811 B2
(45) Date of Patent: Aug. 21, 2018

(54) LIQUID CRYSTAL DISPLAY DEVICE HAVING TOUCH SCREEN AND TEST METHOD OF TOUCH PANEL

(71) Applicant: LG Display Co., Ltd., Seoul (KR)

(72) Inventors: Jong Hyun Park, Busan (KR); Je Hyung Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 120 days.

(21) Appl. No.: 14/881,346

(22) Filed: Oct. 13, 2015

(65) Prior Publication Data

US 2016/0105952 A1    Apr. 14, 2016

(30) Foreign Application Priority Data

Oct. 14, 2014   (KR) .................. 10-2014-0138381

(51) Int. Cl.
G02F 1/1333      (2006.01)
G02F 1/13        (2006.01)

(52) U.S. Cl.
CPC ........ *G02F 1/13338* (2013.01); *G02F 1/1309* (2013.01); *G02F 2201/121* (2013.01)

(58) Field of Classification Search
CPC combination set(s) only.
See application file for complete search history.

(56) References Cited

U.S. PATENT DOCUMENTS

| | | | |
|---|---|---|---|
| 2010/0123846 A1* | 5/2010 | Kim | G02F 1/1345 349/46 |
| 2010/0149473 A1* | 6/2010 | Guo | G02F 1/1345 349/122 |
| 2011/0193817 A1 | 8/2011 | Byun et al. | |
| 2011/0210927 A1 | 9/2011 | Mizuhashi et al. | |
| 2013/0215075 A1 | 8/2013 | Lee et al. | |
| 2013/0307817 A1 | 11/2013 | Kim | |
| 2013/0314342 A1 | 11/2013 | Kim et al. | |
| 2014/0045151 A1 | 2/2014 | Highet et al. | |
| 2014/0085995 A1 | 3/2014 | Greenfield et al. | |
| 2014/0098055 A1 | 4/2014 | Choi et al. | |
| 2014/0184543 A1 | 7/2014 | Kim et al. | |
| 2015/0163942 A1 | 6/2015 | Wu | |

FOREIGN PATENT DOCUMENTS

| | | |
|---|---|---|
| CN | 101833910 A | 9/2010 |
| CN | 103761019 A | 4/2014 |
| CN | 103885263 A | 6/2014 |
| CN | 103914175 A | 7/2014 |

(Continued)

OTHER PUBLICATIONS

The First Office Action dated Feb. 12, 2018 from the State Intellectual Property Office of People's Republic of China in related Chinese application No. 201510661461.8.

*Primary Examiner* — Robin Mishler (74) *Attorney, Agent, or Firm* — Morgan, Lewis & Bockius LLP (57) ABSTRACT

A liquid crystal display device having a touch screen and a test method of a touch panel are provided that can prevent a block dim that may occur in a lighting test. The liquid crystal display device includes common voltage probe pads, which are connected to common voltage output pads and are larger than the common voltage output pads, in a non-display area of the touch panel.

12 Claims, 8 Drawing Sheets

(56) References Cited

FOREIGN PATENT DOCUMENTS

| KR | 20040062185 A | 7/2004 |
|----|---------------|--------|
| KR | 10-2013-0129620 A | 11/2013 |
| KR | 10-1330320 B1 | 11/2013 |
| KR | 10-2013-0132061 A | 12/2013 |
| KR | 10-2013-0132197 A | 12/2013 |
| KR | 20140045151 A | 4/2014 |
| KR | 20140085995 A | 7/2014 |

\* cited by examiner

LIQUID CRYSTAL DISPLAY DEVICE HAVING TOUCH SCREEN AND TEST METHOD OF TOUCH PANEL

CROSS REFERENCE TO RELATED APPLICATIONS

This application claims the benefit of the Korean Patent Application No. 10-2014-0138381 filed on Oct. 14, 2014, which is hereby incorporated by reference as if fully set forth herein.

BACKGROUND

Field of the Invention

The present invention relates to a liquid crystal display device having a touch screen and a test method of a touch panel, and more particularly, to a liquid crystal display device having a touch screen and a test method of a touch panel that can prevent a block dim which may occur in a lighting test.

Discussion of the Related Art

In recent years, various functions in addition to a function of displaying an image have been added to a liquid crystal display device. For example, a liquid crystal display device having a touch screen has been actively studied.

A touch screen has been applied to industrial terminals, notebook computers, banking automated machines, game machines, monitors, mobile phones, and the like more and more, and has been used more widely because it can be easily manipulated by any one.

Touch screens can be classified into a resistive type, a capacitive type, and an infrared type depending on a sensing method. Recently, an in-cell touch type has been widely used which have a merit in slimming. In this regard, the applicant of the present invention has proposed a system of using plural touch electrodes as touch electrodes in a touch sensing period and using the plural touch electrodes as common electrodes to which a common voltage Vcom is applied in a display period in an in-cell touch type liquid crystal display device.

Figure 1:
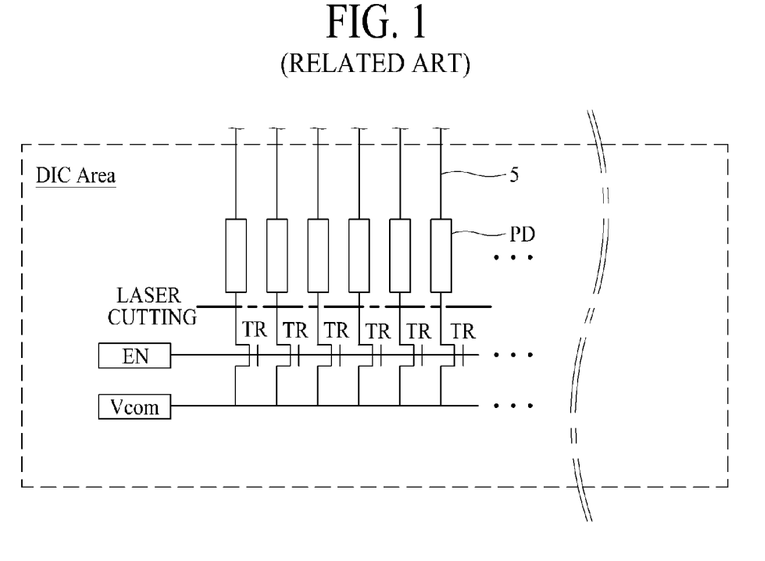
FIG. 1 is a diagram illustrating a lighting test method of touch routing lines according to the related art.

In a process of manufacturing a liquid crystal display device according to the related art, a module step of bonding a drive integrated circuit (IC) and a flexible printed circuit (FPC) is carried out after a liquid crystal panel is manufactured. A lighting test is carried out before the module step. The liquid crystal display device according to the related art includes lighting-test switching elements TR in a non-display area of the liquid crystal panel for the lighting test, and the lighting test is carried out on data lines, gate lines, and touch routing lines. For example, as illustrated in FIG. 1, an area DIC area on which a drive IC is mounted in the liquid crystal panel is provided with pads PD connected to touch electrodes via touch routing lines 5 and the lighting-test switching elements TR connected to the pads PD. The lighting-test switching elements TR are turned on in response to an enable signal EN applied thereto in the lighting test and supply a common voltage Vcom to the pads PD.

The above-mentioned liquid crystal display device having a touch screen has the following problems.

First, noise occurs in the test common voltage Vcom due to parasitic capacitance of the lighting-test switching elements TR and a block dim occurs due to the noise.

Second, the lighting-test switching elements TR are necessary for only carrying out the lighting test and are not necessary in a display period after a product is completed.

After a product is completed, a leakage current via the lighting-test switching elements TR may occur, which may cause a distortion of the common voltage Vcom and display failure due to the distortion of the common voltage.

Third, a method of disconnecting the pads PD and the lighting-test switching elements TR using laser cutting can be considered to prevent a leakage current via the lighting-test switching elements TR, but this method has a problem in that costs increase due to addition of a step and the lighting test cannot be performed again when a defect is found in subsequent steps.

SUMMARY

Accordingly, the present invention is directed to a liquid crystal display device having a touch screen and a test method of a touch panel that substantially obviate one or more of the problems due to limitations and disadvantages of the related art.

An object of the present invention is to provide a display device having a touch screen and a test method of a touch panel that can facilitate a lighting test on touch routing lines and prevent a block dim due to a distortion of a common voltage by making lighting-test switching elements unnecessary.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch panel comprises a touch electrode disposed on a substrate; a first pad connected to the touch electrode via a touch routing line; and a second pad connected to the first pad via an extension of the touch routing line, wherein the second pad is larger than the first pad.

In another aspect, a liquid crystal display device having touch screen comprises a pixel electrode connected to a TFT disposed on a substrate; a touch electrode disposed on the pixel electrode; a first pad connected to the touch electrode via a touch routing line; and a second pad connected to the first pad via an extension of the touch routing line, wherein the second pad is larger than the first pad.

In another aspect, a lighting test method of a touch panel comprises preparing a touch panel which includes a touch electrode disposed on a substrate, a first pad connected to the touch electrode via a touch routing line, and a second pad connected to the first pad via an extension of the touch routing line and in which the second pad is larger than the first pad; disposing a jig bar above the second pad; and bringing the jig bar into contact with the second pad and applying a test signal to the second pad.

In another aspect, a liquid crystal display device having a touch screen comprises a common voltage probe pad, which is connected to a common voltage output pad and is larger than the common voltage output pad, in a non-display area of a touch panel.

In another aspect, a test method of a touch panel comprises preparing a touch panel having a common voltage probe pad, which is connected to a common voltage output pad and is larger than the common voltage output pad, in a non-display area; and bringing a jig bar into contact with the common voltage probe pad and applying a test signal to the common voltage probe pad.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Terms described in this specification should be understood as follows. It should be understood that a singular term may include two or more elements unless differently mentioned. Terms such as "first" and "second" can be used to distinguish an element from another element and the scope of the present invention should not be limited by the terms. It should be understood that terms such as "include" and "have" do not exclude the possibility of existence or addition of one or more other different features, numbers, steps, operations, elements, components, or combinations thereof. It should also be understood that the term "at least one" includes all possible combinations of one or more relevant items. For example, an expression "at least one of a first item, a second item, and a third item" means all possible combinations of items from two or more of the first item, the second item, and the third item as well as each of the first item, the second item, and the third item. The term "on ~" includes a case in which a third element is interposed therebetween as well as a case in which an element is formed immediately on another element.

Hereinafter, a liquid crystal display device having a touch screen and a test method of a touch panel according to exemplary embodiments of the present invention will be described in detail with reference to the accompanying drawings.

Figure 2:
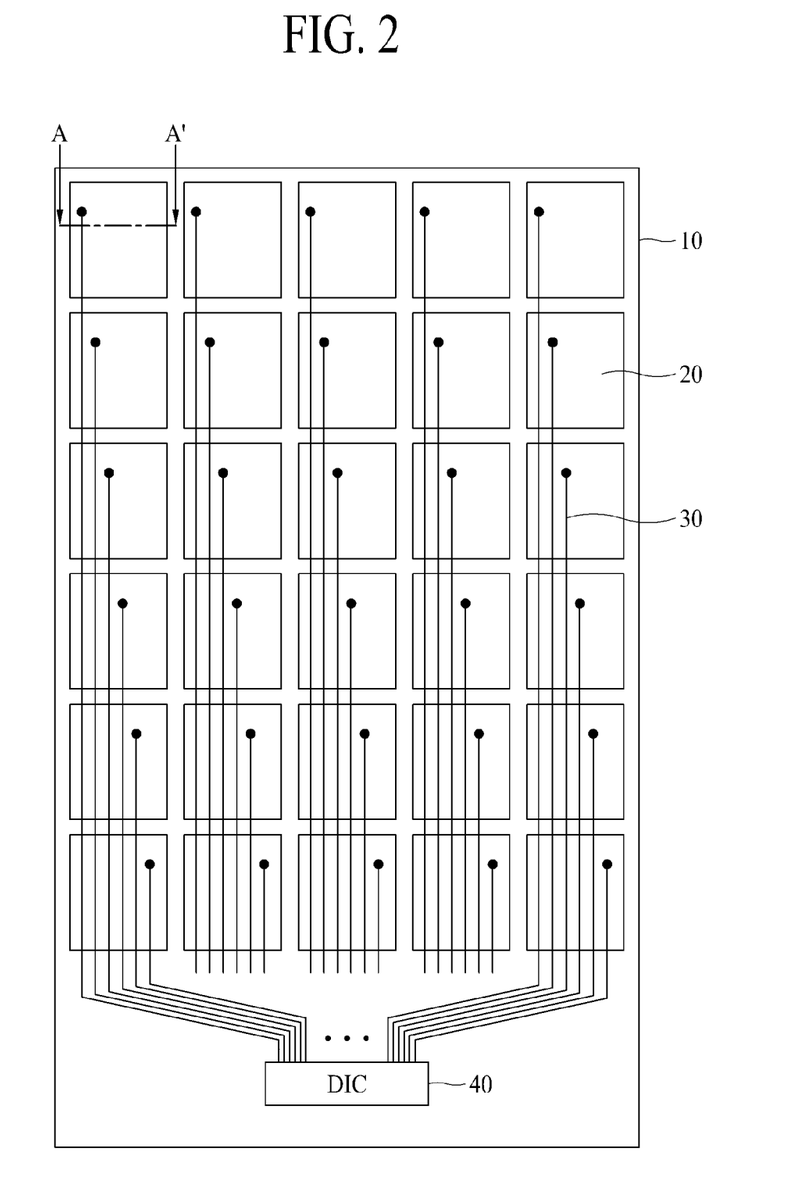
FIG. 2 is a diagram illustrating a configuration of a liquid crystal display device according to an example embodiment of the present invention.

FIG. 2 is a diagram illustrating a configuration of a liquid crystal display device according to an example embodiment of the present invention.

With reference to FIG. 2, the liquid crystal display device includes a liquid crystal panel 10 as a touch panel. That is, the liquid crystal panel 10 has a touch panel built therein and the liquid crystal panel 10 in the following description means a touch panel.

The liquid crystal panel 10 includes a liquid crystal layer formed between two substrates. The substrates may be glass substrates, plastic substrates, film substrates, or the like.

A black matrix, a color filter, and the like are formed on an upper substrate of the liquid crystal panel 10. A polarizer is attached to the upper substrate and the lower substrate of the liquid crystal panel 10, and an alignment layer for setting a pretilt angle of liquid crystal is formed in an inner surface coming in contact with the liquid crystal layer. Spacers for maintaining a cell gap of liquid crystal cells are formed between the upper substrate and the lower substrate of the liquid crystal panel 10. The pixel array formed on the lower substrate of the liquid crystal panel 10 includes data lines, gate lines intersecting the data lines, and pixels arranged in a matrix shape. The pixel array further includes plural thin film transistors (TFTs) formed at intersections of the data lines and the gate lines, and pixel electrodes PXL connected to the TFTs, and storage capacitors connected to the pixel electrodes PXL to maintain a pixel voltage. A liquid cell included in each pixel adjusts an amount of incident light transmitted depending on a data voltage applied to the pixel electrode PXL and a common voltage applied to a common electrode 20.

The common electrodes 20 of the liquid crystal panel 10 also serve as touch electrodes. That is, the common electrodes 20 are supplied with the common voltage to drive the liquid crystal cells in a display period, and are supplied with a driving pulse to sense a touch of a user in a touch sensing period. Accordingly, the touch electrodes 20 in the following description mean the common electrode which is supplied with the common voltage Vcom in the display period. Accordingly, the present invention does not provide any particular touch electrode and thus can reduce a thickness of a liquid crystal panel.

As illustrated in FIG. 2, the touch electrodes 20 are disposed on the lower substrate of the liquid crystal panel 10 to overlap the pixel electrodes PXL. The size of each touch electrode 20 may be larger than the area of each pixel. The touch electrodes 20 are connected to plural touch routing lines 30 in a one-to-one manner and are connected to a driving integrated circuit (IC) 40.

The driving IC 40 is mounted on a non-display area of the liquid crystal panel 10 to drive the liquid crystal panel 10. The driving IC 40 includes a data drive circuit that drives the data lines, a gate drive circuit that drives the gate lines, a timing control circuit that controls the data drive circuit and the gate drive circuit, a touch sensing circuit that drives the touch routing lines 30 to sense a touch of a user, and a power supply circuit.

The configurations and methods in which a touch sensing circuit of the driving IC 40 senses a touch are disclosed in Korean Patent Application Laid-open No. 10-2013-

0129620, Korean Patent Application Laid-open No. 10-2013-0132061, Korean Patent Application Laid-open No. 10-2013-0132197, and Korean Patent No. 10-1330320 which have been proposed by the applicant of the present invention and thus detailed description thereof will not be repeated.

On the other hand, a pad section is disposed in the non-display area of the liquid crystal panel 10. The pad section includes an input pad section disposed in a peripheral area of the liquid crystal panel 10 and a bump pad section disposed in a mounting area of the driving IC 40 so as to come in contact with input and output bumps of the driving IC 40.

The bump pad section coming in contact with the bumps of the driving IC 40 will be specifically described below.

Figure 3:
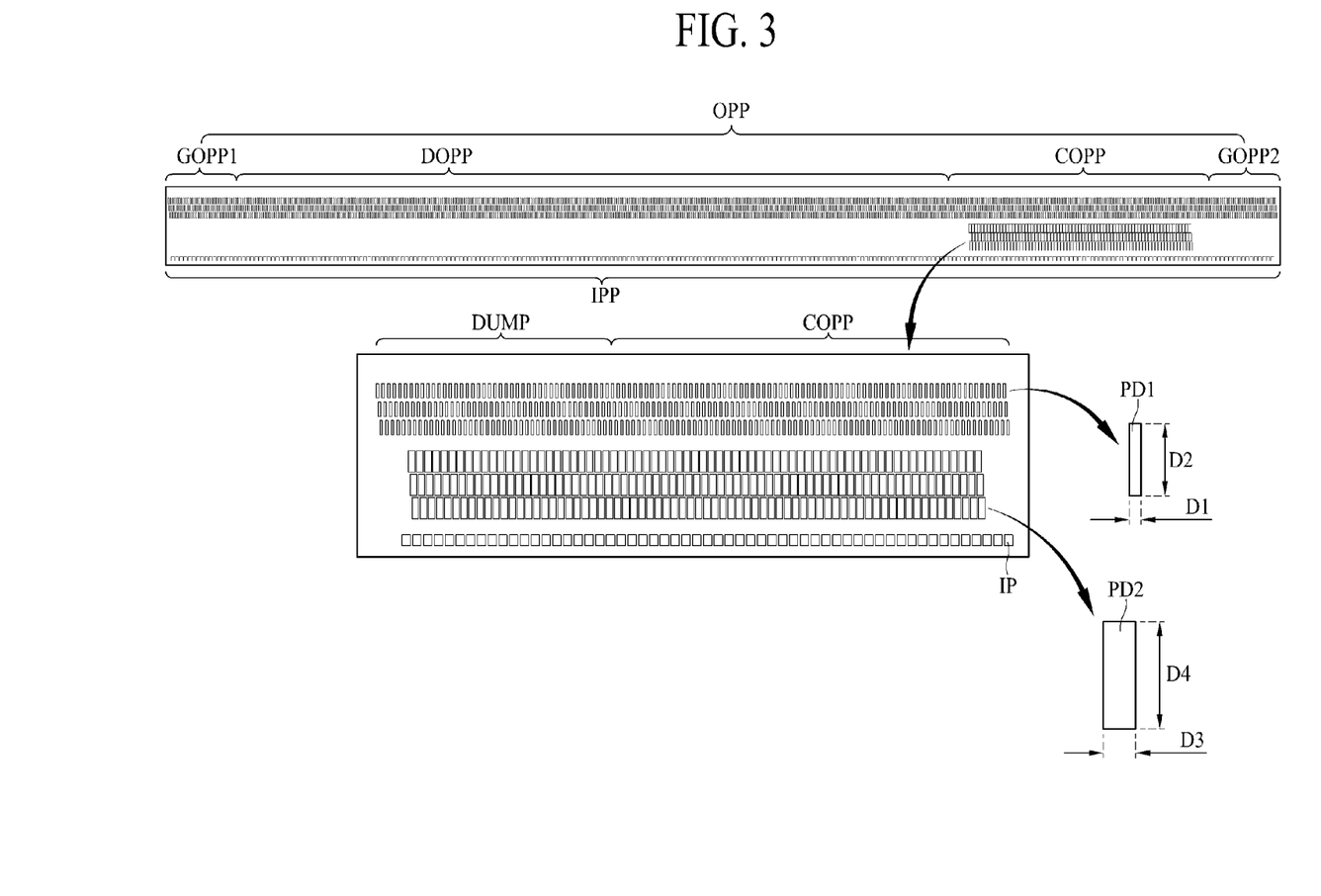
FIG. 3 is a plan view illustrating an area on which a driving IC is mounted in a non-display area of a liquid crystal panel.
Figure 4:
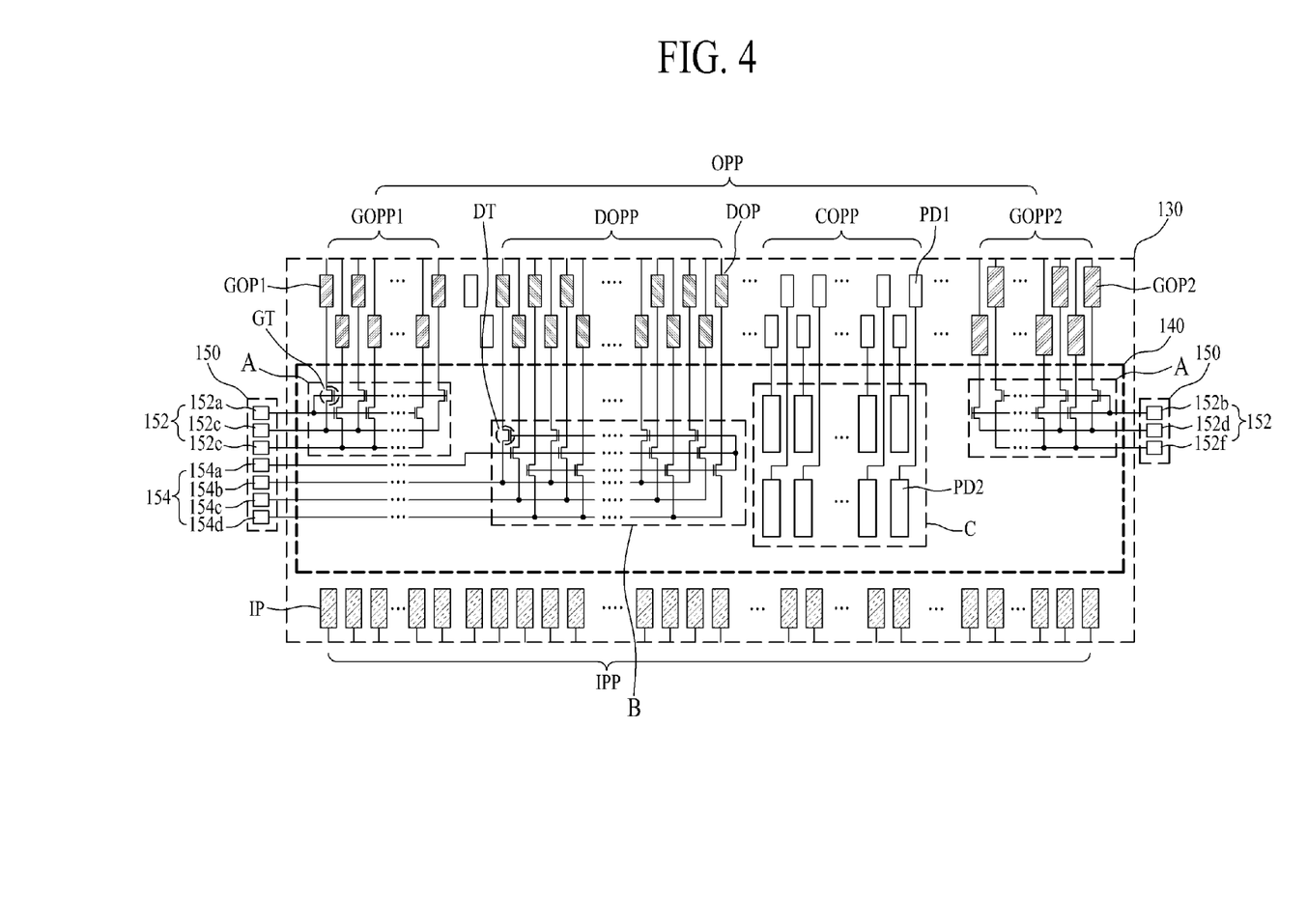
FIG. 4 is a diagram schematically illustrating a configuration of the mounting area of the driving IC illustrated in FIG. 3.

FIG. 3 is a plan view illustrating an area in which the driving IC 40 is mounted in the non-display area of the liquid crystal panel 10. FIG. 4 is a diagram schematically illustrating a configuration of the mounting area of the driving IC 40 illustrated in FIG. 3.

With reference to FIGS. 3 and 4, the mounting area 130 of the driving IC 40 in the liquid crystal panel 10 includes an input pad section IPP and an output pad section OPP.

The input pad section IPP includes plural input pads IP which are disposed on one side of the mounting area 130 of the driving IC 40 and come in contact with input bumps of the driving IC 40. The plural input pads IP are connected to the input pads via plural link lines (not illustrated) and supplies signals from an FPCB to the driving IC 40. Here, the plural input pads IP may be arranged in parallel at predetermined intervals or may be arranged in plural columns having a zigzag shape.

The output pad section OPP includes plural output pad sections which are disposed on the other side of the mounting area 130 of the driving IC 40 and come in contact with output bumps of the driving IC 40. The plural output pad sections include a first gate output pad section GOPP1, a data output pad section DOPP, a common voltage output pad section COPP, and a second gate output pad section GOPP2. Here, pads constituting the output pad section OPP may be arranged in parallel at predetermined intervals or may be arranged in plural columns having a zigzag shape.

The first gate output pad section GOPP1 includes plural first gate output pads GOP1. The first gate output pads GOP1 are electrically connected to a first gate line group which corresponds to a half of the plural gate lines formed on the lower substrate. The first gate output pads GOP1 are electrically connected to plural gate output bumps (not illustrated) formed in the driving IC 40 and supply a gate signal output from the driving IC 40 to the first gate line group.

The second gate output pad section GOPP2 includes plural second gate output pads GOP2. The second gate output pads GOP2 are electrically connected to a second gate line group other than the first gate line group among the gate lines formed on the lower substrate. The second gate output pads GOP2 are electrically connected to plural gate output bumps (not illustrated) formed in the driving IC 40 and supply a gate signal output from the driving IC 40 to the second gate line group.

The data output pad section DOPP is disposed between the first and second gate output pad sections GOPP1 and GOPP2 and includes plural data output pads DOP. The data output pads DOP are electrically connected to the data lines formed on the lower substrate. The data output pads DOP are electrically connected to plural data output bumps (not illustrated) formed in the driving IC 40 and supplies a data signal output from the driving IC 40 to the data lines.

The common voltage output pad section COPP includes plural common voltage output pads PD1 which are disposed between the second gate output pad section GOPP2 and the data output pad section DOPP. The common voltage output pads PD1 are electrically connected to the plural touch routing lines 30 formed on the lower substrate. The common voltage output pads PD1 are electrically connected to plural common voltage output pads (not illustrated) formed in the driving IC 40 and supply a common voltage or a touch driving signal output from the driving IC 40 to the touch routing lines 30.

On the other hand, the gate lines, a lighting test section 140 for inspecting failure of the data lines, and the touch routing lines is disposed between the input pad section IPP and the output pad section OPP. The lighting test section 140 includes a gate lighting test section A for performing a lighting test on the gate lines, a data lighting test section B for performing a lighting test on the data lines, and a common voltage lighting test section C for performing a lighting test on the data lines.

The gate lighting test section A includes plural gate TFTs GT. The plural gate TFTs GT are switched in response to first and second gate enable signals in the lighting test step so as to selectively supply first to fourth gate test signals to the gate lines GL1 to GLm and to turn on the TFTs of the pixels formed in the display area 110. For this purpose, the gate TFTs GT are connected to plural gate auto probe pads 152 and supply a gate test signal, which is supplied from the gate auto probe pads, to the first and second gate output pad sections GOPP1 and GOPp2.

The gate auto probe pads 152 include first to sixth gate probe pads 152*a*, 152*b*, 152*c*, 152*d*, 152*e*, and 152*f* which are disposed outside the mounting area 130 of the driving IC 40. The first and second gate probe pads 152*a* and 152*b* supply a gate enable signal from a test jig to the gate TFTs GT in the lighting test step. The third to sixth gate probe pads 152*c*, 152*d*, 152*e*, and 152*f* supply a gate test signal, which is supplied from a test jig in the lighting test step, to the gate TFTs GT.

The data lighting test section B includes plural data TFTs DT. The data TFTs DT are switched in response to a data enable signal synchronized with the switching of the gate TFTs GT in the lighting test step so as to supply the data test signal to the data lines to inspect the driving of the pixels. For this purpose, the data TFTs DT are connected to plural data auto probe pads 154 and supply the data test signal, which is supplied from the data auto probe pads 154, to the data output pad section DOPP.

The data auto probe pads 154 include first to fourth data probe pads 154*a*, 154*b*, 154*c*, and 154*d* which are disposed outside the mounting area 130 of the driving IC 40. The first data probe pad 154*a* supplies a data enable signal, which is supplied from a test jig in the lighting test step, to the data TFTs DT. The second to fourth probe pads 154*b*, 154*c*, and 154*d* supplies different data test signals, which are supplied from a test jig in the lighting test step, to the data TFTs DT.

The common voltage lighting test section C includes plural common voltage probe pads PD2 which are disposed between the common voltage output pad section COPP and the input pad section IPP. The common voltage probe pads PD2 supply a common voltage, which is supplied from a test jig in the lighting test step, to the common voltage output pads PD1.

Particularly, as illustrated in FIG. 3, the present invention is characterized in that the common voltage probe pads PD2 are larger than the common voltage output pads PD1. For example, when the horizontal length D1 of each common voltage output pad PD1 is 14.7 μm and the vertical length D2 of each common voltage output pad PD1 is 95 μm, the horizontal length D3 of each common voltage probe pad PD2 may be 38 μm and the vertical length D4 of each common voltage probe pad PD2 may be 140 μm.

According to the present invention, a jig bar JB may be provided as a tool for applying the common voltage to the common voltage output pads PD1 and the jig bar JB may be brought into direct contact with the common voltage probe pads PD2. Accordingly, according to the present invention, it is possible to facilitate the lighting test on the touch routing lines and to make particular switching elements for the lighting test on the touch routing lines unnecessary. As a result, it is possible to prevent a distortion of a common voltage due to the switching elements and a block dim due to the distortion of the common voltage.

The configuration for the lighting test and the lighting test method using the configuration will be specifically described below from the viewpoint of the touch panel. For the purpose of convenience of explanation, the common voltage output pads PD1 are defined as first pads PD1 and the common voltage probe pads PD2 are defined as second pads PD2.

Figure 5:
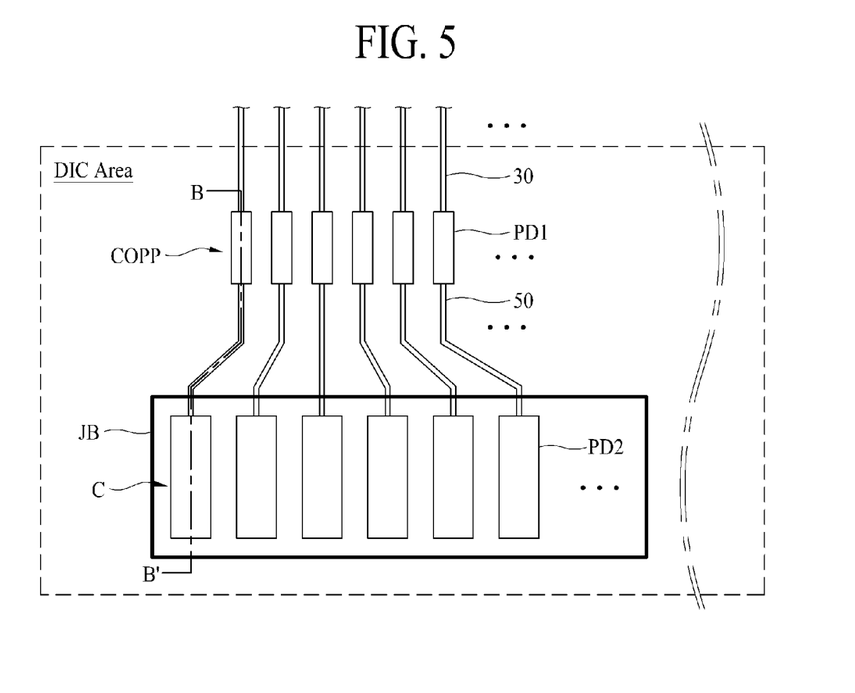
FIG. 5 is a plan view schematically illustrating a common voltage output pad section and a common voltage lighting test section illustrated in FIGS. 3 and 4.

FIG. 5 is a plan view schematically illustrating the common voltage output pad section COPP and the common voltage lighting test section C illustrated in FIGS. 3 and 4.

With reference to FIG. 5, the touch routing lines 30 extend in the mounting area of the driving IC 40 and the touch routing lines 30 are connected to the first pads PD1. That is, the first pads PD1 are connected to the touch electrodes 20 via the touch routing lines 30.

On the other hand, the second pads PD2 are disposed as the common voltage lighting test section C inside the mounting area of the driving IC 40. Here, the second pads PD2 are larger than the first pads PD1. This is to apply a common voltage to the touch routing lines 30 by bringing the jig bar JB into direct contact with the second pads PD2 in the lighting test step.

The second pads PD2 are electrically connected to the first pads PD1 via the extensions 50 of the touch routing lines 30. The connection structure of the first and second pads PD1 and PD2 will be more specifically described below.

Figure 6:
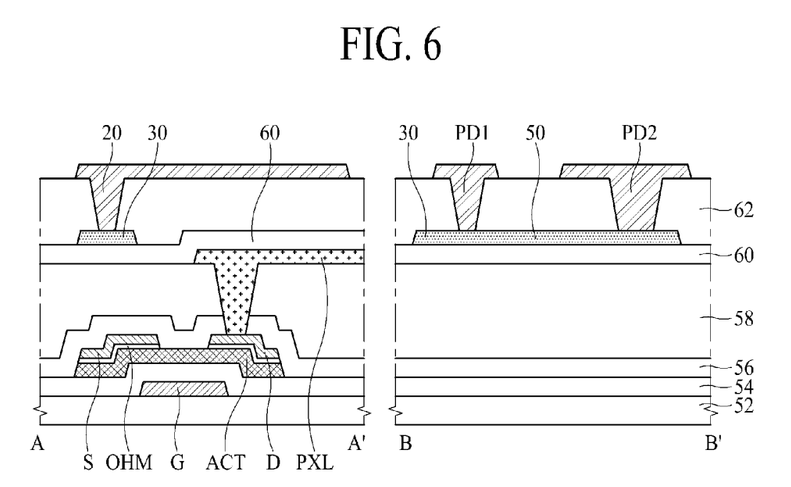
FIG. 6 is a cross-sectional view of a touch panels taken along line A-A' in FIG. 2 and line B-B' in FIG. 5.

FIG. 6 is a cross-sectional view of the liquid crystal panel taken along line A-A' in FIG. 2 and line B-B' in FIG. 5.

In the example of FIG. 6, each pixel of the liquid crystal panel 10 is provided with a TFT connected to the corresponding gate line and the corresponding data line.

The TFT includes a gate electrode G connected to the gate line, a source electrode S connected to the data line, and a drain electrode D separated from the source electrode S. The TFT includes an active layer ACT forming a channel between the source and drain electrodes S and D and an ohmic layer OHM disposed between the source and drain electrodes S and D and the active layer ACT.

The TFT is turned on in response to the gate signal supplied to the gate electrode G and supplies a data signal, which is supplied from the data line at the time of turning-on, to the corresponding pixel electrode PXL.

The pixel electrode PXL is formed on a second protective layer 58 covering the TFT. The pixel electrode PXL is connected to the drain electrode D via a pixel contact hole penetrating the second protective layer 58.

A first insulating film 60 covering the pixel electrode PXL is formed on the pixel electrode PXL and the touch routing line 30 is formed on the first insulating film 60. A second insulating film 62 covering the touch routing line 30 is formed on the touch routing line 30, and the touch electrode 20 is formed on the second insulating film 62. The touch electrode 20 is electrically connected to the touch routing line 30 via a common voltage contact hole penetrating the second insulating film.

On the other hand, the common voltage output pad section COPP and the common voltage lighting test section C will be described below based on the stacked structure of the liquid crystal panel 10.

First, the touch routing lines 30 which are disposed on the first insulating film 60 and which extend from the pixels are disposed in the common voltage output pad section COPP. The touch routing lines 30 extend to overlap with the first pads PD1, further extend from the overlapping portion with the first pads PD1 and overlaps with the second pads PD1 and PD2. That is, the touch routing lines 30 extend to overlap with the first and second pads PD1 and PD2.

The first pads PD1 are disposed on the second insulating film 62 and are electrically connected to the touch routing lines 30 via first contact holes penetrating the second insulating film 62. The second pads PD2 are disposed on the second insulating film 62 and are electrically connected to the touch routing lines 30 via second contact holes penetrating the second insulating film 62.

Figure 7:
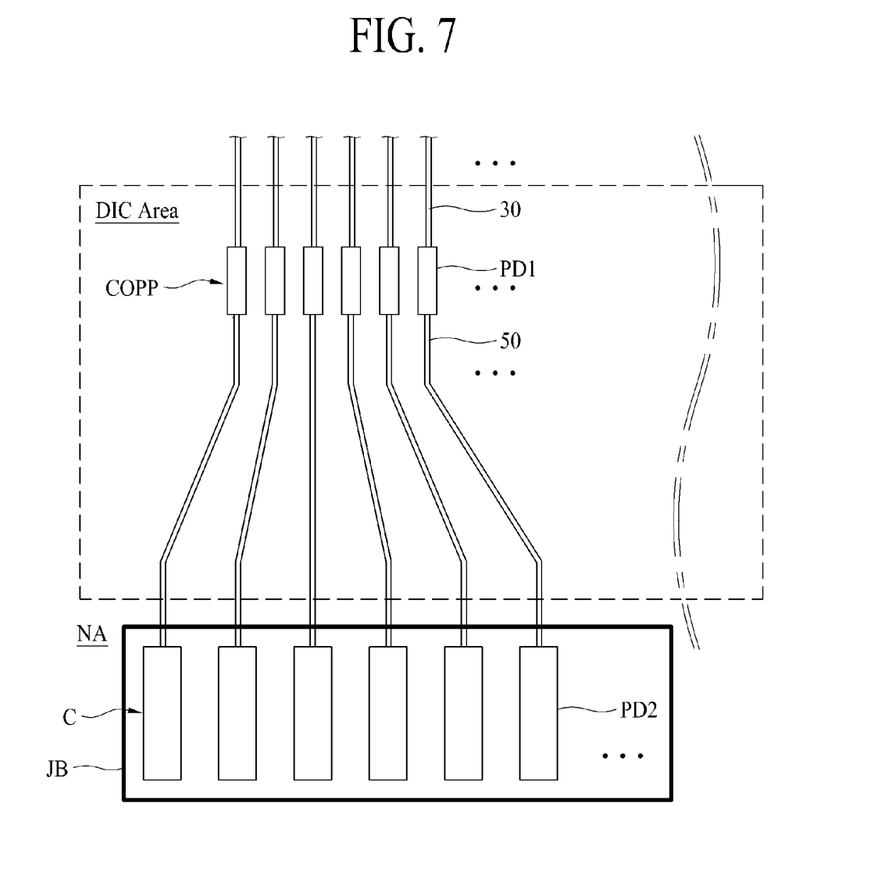
FIG. 7 is a diagram illustrating second pads which are arranged outside the mounting area of the driving IC.

In the above-mentioned example embodiment, the second pads PD2 are disposed inside the mounting area of the driving IC 40, but the second pads PD2 may be disposed outside the mounting area of the driving IC 40 as illustrated in FIG. 7. In this case, it is possible to design the second pads PD2 to be larger and thus to facilitate the lighting test step. On the contrary, when the second pads PD2 are disposed inside the mounting area of the driving IC 40 as in the above-mentioned example embodiment, it is possible to reduce the area of the non-display area and thus to facilitate designing of a barrow bezel.

Figure 8:
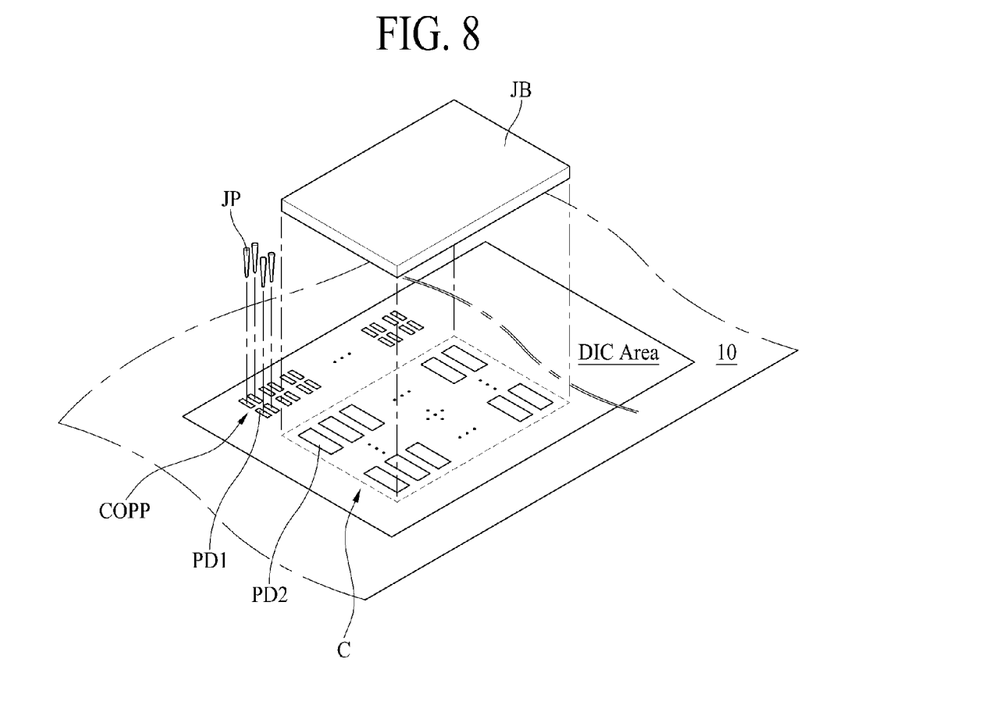
FIG. 8 is a perspective view of a touch panel illustrating a lighting test method of a touch panel according to an example embodiment of the present invention.

FIG. 8 is a perspective view of a touch panel illustrating the lighting test method of the touch panel according to an example embodiment of the present invention. Specifically, FIG. 8 illustrates a common voltage output pad section COPP and the common voltage lighting test section C.

In accordance with FIG. 8, the lighting test method may include the following steps.

First, a touch panel including the common voltage output pad section COPP and the common voltage lighting test section C in the mounting area of the driving IC 40 is prepared.

Subsequently, a test jig bar JB is disposed above the second pads PD2 of the common voltage lighting test section C. At this time, the jig bar JB is disposed to overlap with the plural second pads PD2.

Then, the jig bar JB is lowered to bring the jig bar JB into contact with the second pads PD2 and a common voltage is applied as a test signal to the plural second pads PD2 via the jig bar JB.

In this case, the common voltage can be applied in a hybrid type. That is, in the present invention, the common voltage can be applied via jig pins JP by applying the common voltage to the plural second pads PD2 via the jig bar JB and bringing plural jig pins JP, which correspond to the plural first pads PD1 in a one-to-one manner, into contact with the plural first pads PD1. In this case, since the lighting test step on the touch routing lines 30 are simultaneously performed in the common voltage output pad section COPP and the common voltage lighting test section C, it is possible to more accurately perform the test.

Figure 9:
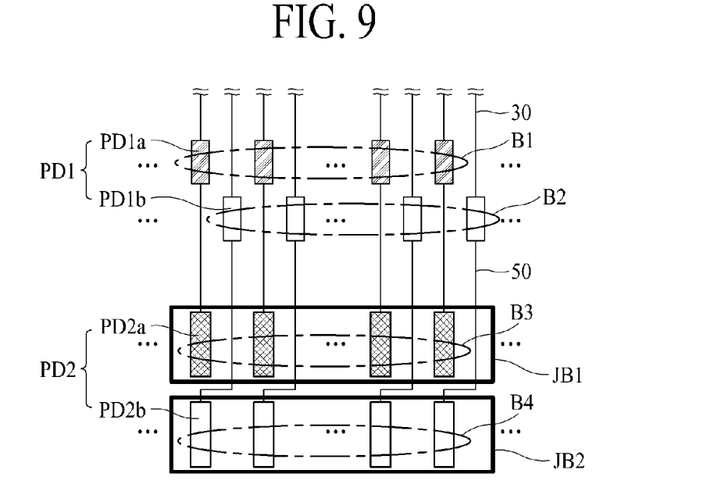
FIG. 9 is a plan view schematically illustrating a common voltage output pad section and a common voltage lighting test section according to another example embodiment of the present invention.
Figure 10:
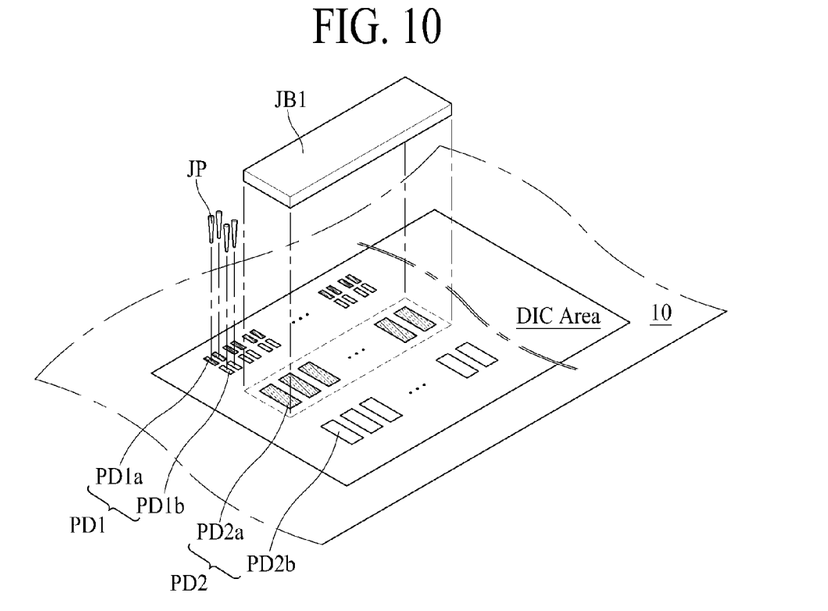
FIG. 10 is a perspective view of a touch panel illustrating a lighting test method of the touch panel illustrated in FIG. 9.
Figure 11:
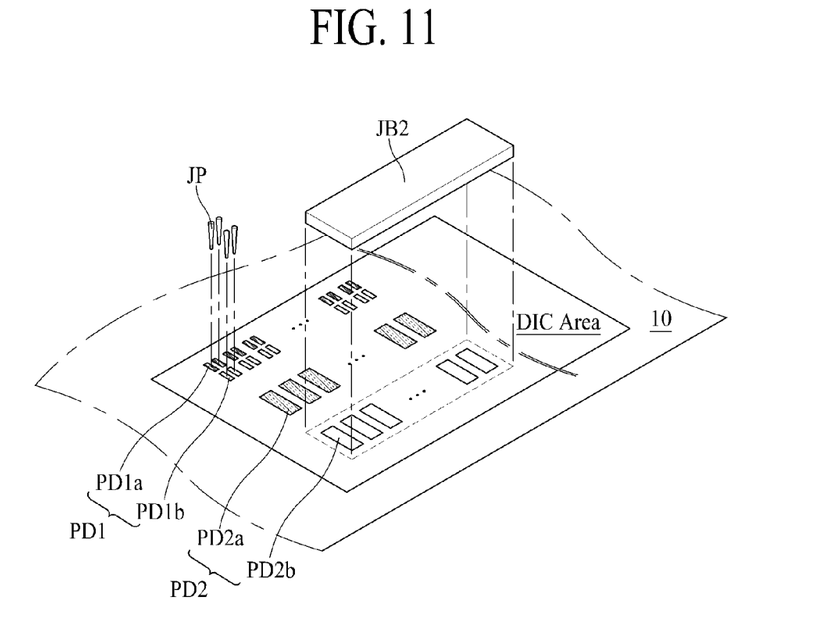
FIG. 11 is a perspective view of a touch panel illustrating the lighting test method of the touch panel illustrated in FIG. 9.

FIG. 9 is a plan view schematically illustrating a common voltage output pad section COPP and a common voltage lighting test section C according to another example embodiment of the present invention. FIG. 10 is a perspective view of a touch panel illustrating the lighting test method of the touch panel illustrated in FIG. 9. FIG. 11 is a perspective view of a touch panel illustrating the lighting test method of the touch panel illustrated in FIG. 9.

As shown in FIG. 9, plural first pads PD1 may be formed to be partitioned into first and second groups B1 and B2. Plural second pads PD2 are formed to be partitioned into third and fourth groups B3 and B4.

That is, in the present invention, the first pads PD1 can be partitioned into the first and second groups B1 and B2 and different common voltages can be applied to the first and second groups B1 and B2 in the lighting test step. This is to inspect a short circuit between the neighboring touch routing lines 30 as well as a disconnection between the touch routing lines 30. For this purpose, the first to fourth groups B1 to B4 are configured as follows.

The first group B1 of the first pads PD1 can include plural first output pads PD1a which are disposed at the odd-numbered positions among the first pads PD1. The first group B1 is electrically connected to a first touch routing line group corresponding to a half of the touch routing lines 30.

The second group B2 of the first pads PD1 can include plural second output pads PD2a which are disposed at the even-numbered positions among the first pads PD1. The second group B2 is electrically connected to a second touch routing line group other than the first touch routing line group among the touch routing lines 30.

With reference to FIGS. 9 and 10, the third group B3 of the second pads PD2 can include plural first test pads PD2a which are disposed in a first column among the second pads PD2. The third group B3 is connected to the first group B1 in a one-to-one correspondence manner and supplies a first common voltage, which is supplied from a first jig bar JB1 in the lighting test step, to the first group B1. At this time, in the hybrid manner, plural jig pins JP can be brought into direct contact with the first group B1 and the first common voltage can be supplied to the first group B1 via the jig pins JP.

With reference to FIGS. 9 and 10, the fourth group B4 of the second pads PD2 can include plural second test pads PD2b which are disposed in a second column among the second pads PD2. The fourth group B4 is connected to the second group B2 in a one-to-one correspondence manner and supplies a second common voltage, which is supplied from a second jig bar JB2 in the lighting test step, to the second group B2. At this time, in the hybrid manner, plural jig pins JP can be brought into direct contact with the second group B2 and the second common voltage can be supplied to the second group B2 via the jig pins JP.

As described above in detail, in the present invention, the common voltage probe pads PD2 which are connected to the common voltage output pads PD1 and which are larger than the common voltage output pads PD1 are formed. In the present invention, the jig bar JB may be provided as a tool for applying a common voltage to the common voltage output pads PD1 in the lighting test step, and the common voltage may be applied to the touch routing lines by bringing the jig bar JB into direct contact with the common voltage probe pads PD2. Accordingly, it is possible to facilitate the lighting test on the touch routing lines and to make switching elements for the lighting test on the touch routing lines unnecessary. As a result, it is possible to prevent a distortion of a common voltage due to switching elements and a block dim due to the distortion of the common voltage.

Embodiments of the present invention may enable a number of advantages. For example, the liquid crystal display device having a touch screen according to the present invention may include common voltage probe pads which are connected to common voltage output pads and are larger than the common voltage output pads. The liquid crystal display device may include a jig bar as a tool for applying a common voltage to the common voltage output pads. The common voltage can be applied to the touch routing lines by bringing the jig bar into direct contact with the common voltage probe pads. Accordingly, a lighting test for touch routing lines can be obtained. Further, particular switching elements for the switching elements may be made unnecessary. As a result, a distortion of a common voltage due to the switching elements and a block dim due to the distortion of the common voltage can be prevented.

It will be apparent to those skilled in the art that various modifications and variations can be made in the liquid crystal display device having a touch screen and the test method of a touch panel of the present invention without departing from the spirit or scope of the invention. Thus, it is intended that the present invention cover the modifications and variations of this invention provided they come within the scope of the appended claims and their equivalents.

What is claimed is:

1. A touch panel, comprising:
   a touch electrode disposed on a substrate;
   a first pad connected to the touch electrode via a touch routing line; and
   a second pad connected to the first pad via an extension of the touch routing line,
   wherein the second pad is larger than the first pad,
   the touch routing line and the extension of the touch routing line are disposed on a first insulating film, and
   the touch electrode and the first and second pads are disposed on a second insulating film covering the first insulating film.

2. The touch panel according to claim 1, further comprising a driving integrated circuit (IC) mounted on the substrate,
   wherein the first pad is connected to an output bump of the driving IC and the second pad is disposed inside a mounting area of the driving IC.

3. The touch panel according to claim 1, further comprising a driving integrated circuit (IC) mounted on the substrate,
   wherein the first pad is connected to an output bump of the driving IC and the second pad is disposed outside a mounting area of the driving IC.

4. The touch panel according to claim 1, wherein a plurality of the first pads are disposed and are partitioned into a first group and a second group, and
   wherein a plurality of the second pads are disposed and are partitioned into a third group connected to the first group and a fourth group connected to the second group.

5. A liquid crystal display device having touch screen, comprising:
   a pixel electrode connected to a TFT disposed on a substrate;
   a touch electrode disposed on the pixel electrode;
   a first pad connected to the touch electrode via a touch routing line; and
   a second pad connected to the first pad via an extension of the touch routing line,
   wherein the second pad is larger than the first pad, the touch routing line and the extension of the touch routing line are disposed on a first insulating film covering the pixel electrode, and the touch electrode and the first and second pads are disposed on a second insulating film covering the first insulating film.

6. The liquid crystal display device having touch screen according to claim 5, further comprising a driving integrated circuit (IC) mounted on the substrate, wherein the first pad is connected to an output bump of the driving IC and the second pad is disposed inside a mounting area of the driving IC.

7. The liquid crystal display device having touch screen according to claim 5, further comprising a driving integrated circuit (IC) mounted on the substrate, wherein the first pad is connected to an output bump of the driving IC and the second pad is disposed outside a mounting area of the driving IC.

8. The liquid crystal display device having touch screen according to claim 6, wherein the driving IC applies a common voltage to the first pad in a display period, and wherein the driving IC applies a touch driving signal to the first pad in a touch sensing period.

9. The liquid crystal display device having touch screen according to claim 5, wherein a plurality of the first pads are disposed and are partitioned into a first group and a second group, and wherein a plurality of the second pads are disposed and are partitioned into a third group connected to the first group and a fourth group connected to the second group.

10. The liquid crystal display device having touch screen according to claim 7, wherein the driving IC applies a common voltage to the first pad in a display period, and wherein the driving IC applies a touch driving signal to the first pad in a touch sensing period.

11. The touch panel according to claim 2, wherein the driving IC applies a common voltage to the first pad in a display period, and wherein the driving IC applies a touch driving signal to the first pad in a touch sensing period.

12. The touch panel according to claim 3, wherein the driving IC applies a common voltage to the first pad in a display period, and wherein the driving IC applies a touch driving signal to the first pad in a touch sensing period.

* * * * *